United States Patent
Robert et al.

(10) Patent No.: US 8,611,409 B2
(45) Date of Patent: Dec. 17, 2013

(54) METHOD AND APPARATUS FOR PERFORMING CHANNEL EQUALIZATION ON A MIMO SIGNAL

(75) Inventors: Anahid Robert, Val de marne (FR); David G. Bateman, Hauts de Siene (FR); Philippe Bernardin, Linas (FR); Stephanie Rouquette-Leveil, Massy (FR)

(73) Assignee: Motorola Mobility LLC, Libertyville, IL (US)

( * ) Notice: Subject to any disclaimer, the term of this patent is extended or adjusted under 35 U.S.C. 154(b) by 407 days.

(21) Appl. No.: 12/808,282

(22) PCT Filed: Dec. 16, 2008

(86) PCT No.: PCT/US2008/086906
§ 371 (c)(1),
(2), (4) Date: Jun. 15, 2010

(87) PCT Pub. No.: WO2009/082643
PCT Pub. Date: Jul. 2, 2009

(65) Prior Publication Data
US 2011/0299582 A1    Dec. 8, 2011

(30) Foreign Application Priority Data
Dec. 26, 2007 (EP) ..................... 07291621

(51) Int. Cl.
*H03H 7/30* (2006.01)
(52) U.S. Cl.
USPC ........... 375/229; 375/260; 375/340; 375/346; 375/350; 370/335; 370/342; 370/344; 370/480; 455/63.1; 455/67.13; 455/114.2; 455/296; 455/501; 341/173; 341/180; 327/551

(58) Field of Classification Search
USPC .......... 375/229, 260, 340, 346, 350; 370/335, 370/342, 344, 480; 455/63.1, 67.13, 114.2, 455/296, 501; 327/551; 341/173, 180
See application file for complete search history.

(56) References Cited

U.S. PATENT DOCUMENTS

| | | |
|---|---|---|
| 2004/0184399 A1 | 9/2004 | Chiou |
| 2004/0228392 A1 | 11/2004 | Zhang et al. |

(Continued)

FOREIGN PATENT DOCUMENTS

| | | |
|---|---|---|
| WO | 2006008565 A1 | 1/2006 |
| WO | 2006050627 A1 | 5/2006 |

OTHER PUBLICATIONS

Anahid, Robert et al. "Report on the implementation an performance of advanced sub-blocks" [Online] Apr. 2007, pp. 1-14, XP002486278.

(Continued)

*Primary Examiner* — Leon Flores

(57) ABSTRACT

A method is provided for performing channel equalization on a wireless signal. The method includes: (i) formulating an equalizer associated with sub-carriers of the wireless signal, wherein the equalizer is a function of a quantity relating to signal quality (305); (ii) determining an adjoint of the equalizer over a selected number of the subcarriers (310); (iii) interpolating the adjoint determined in (ii) to obtain an adjoint of the equalizer over remaining ones of the subcarriers of the wireless signal (315); and (iv) generating an equalized signal for each of the subcarriers using the adjoint of the equalizer over the selected number of subcarriers and the interpolated adjoint over the remaining ones of the subcarriers (320).

10 Claims, 2 Drawing Sheets

(56) References Cited

U.S. PATENT DOCUMENTS

2004/0247061 A1    12/2004    Matsumoto et al.
2007/0076805 A1    4/2007    Kalluri et al.
2008/0317141 A1*    12/2008    Burg et al. .................... 375/260

OTHER PUBLICATIONS

Borgmann M. et al "Interpolation-based efficient matrix inversion for MIMO-OFDM receivers" Signals, Systems and Computers, 2004. Conference record of the Thirty-Eighth Asilomar Conference on Pacific Grove, CA. USA. Nov. 7-10, 2004, Piscataway, NJ, USA—IEEE vol. 2, Nov. 7, 2004, XP010781386.

European Search Report for European Patent Application EP 07291621. Search completed Jun. 30, 2008.

PCT International Search Report & Written Opinion for PCT Patent Application PCT/US2008/086906. Dated Feb. 9, 2009.

Wang, J. et al., "Performance of Linear Interpolation-Based MIMO Detection for MIMO-OFDM Systems", IEEE Wireless Communications and Networking Conference 2004, WCNC 04, vol. 2, pp. 981-986, Mar. 2004.

Proakis, J., "Digital Communications", McGraw-Hill Communications, Aug. 2000.

* cited by examiner

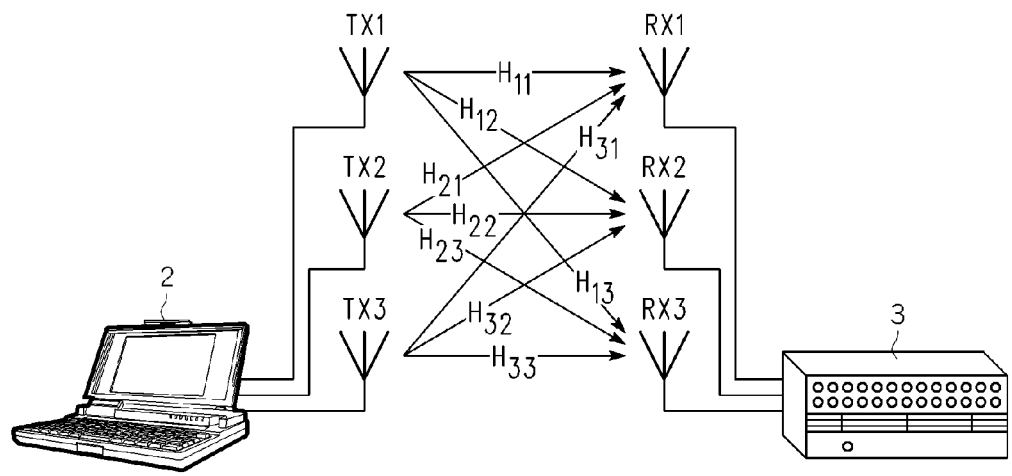
FIG. 1 -PRIOR ART-
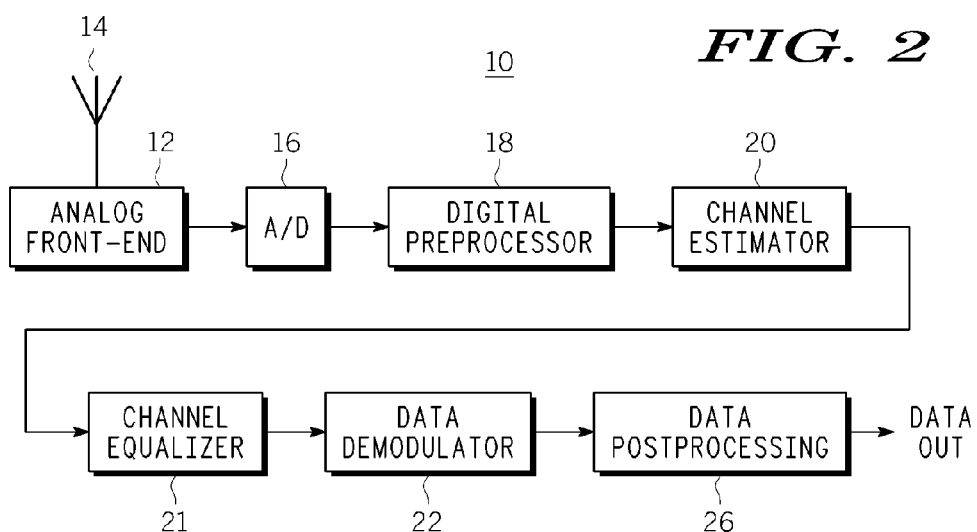
FIG. 2

METHOD AND APPARATUS FOR PERFORMING CHANNEL EQUALIZATION ON A MIMO SIGNAL

FIELD OF THE INVENTION

The present invention relates generally to wireless transmission and reception techniques, and more particularly to a multiple-input, multiple-output transmission and reception system such as those being developed for use in IEEE 802.11 and 802.16 wireless LAN standards.

BACKGROUND OF THE INVENTION

The IEEE 802.11 wireless LAN standardisation process recently created the "high throughput" task group, which aims to generate a new standard (i.e., 802.11n) for wireless LAN systems with a measured throughput of greater than 100 Mbit/s. The dominant technology that promises to be able to deliver these increased speeds are so-called MIMO (multiple-input, multiple-output) systems. MIMO systems are defined by having multiple antennas used for both transmission and reception. The maximum theoretical throughput of such a system scales linearly with the number of antennas, which is the reason that the technology is of great interest for high throughput applications. An example of such a system is shown in FIG. 1, with a portable computer 2 transmitting to an access point where each device has three antennas TX1-TX3.

These systems can offer improved throughput compared to single antenna systems because there is spatial diversity: each piece of information transmitted from each transmitting antenna travels a different path to each receiving antenna RX1-RX3, and as noted above, experiences distortion with different characteristics (different channel transfer functions). In the example of FIG. 1, there are three different channel transfer functions from each antenna to each receiver 3: the transfer function from transmitting antenna x to receiving antenna y is denoted by $H_{xy}$. Greater capacity is obtained by making use of the spatial diversity of these independent or semi-independent channels (perhaps in conjunction with other coding techniques) to improve the chance of successfully decoding the transmitted data. The examples given here use three transmitting antennas. However, any arbitrary number of transmit antennas can be used.

The individual channel transfer functions can be collectively represented by a single channel transfer matrix H, which includes all the physical propagation effects between the transmitting antennas and the receiving antennas. Examples of such physical propagation effects include propagation delay, path loss, large-scale fading due to shadowing, small-scale fading due to multipath propagation, and scattering, diffraction and refraction effects. The channel transfer matrix H also includes various hardware characteristics effecting the signal during transmission, such as pulse shape filters, correlations due to antenna coupling or calibration errors, phase shifts due to non-ideal mixing or lack of transmitter-receiver clock synchronization, and delays due to filtering times.

In order to reconstruct the transmitted signal at the receiver various distortions have to be mitigated or removed through a process referred to as channel equalization or simply equalization. Equalization generally refers to any signal processing that is performed at the transmitter and/or the receiver that is at least partially directed to the mitigation or removal of signal distortions experienced during the transmission of signals, is at least partially directed to the mitigation or removal of interference between signals transmitted over a channel, and/or is at least partially directed to an improvement in the signal-to-noise ratio of the transmitted signal.

Currently, two types of linear equalization are often used to improve the receiver performance, namely non-adaptive linear equalization and adaptive linear equalization. Non-adaptive linear equalizers usually assume "piece-wise" stationarity of the channel and design the equalizer according to some optimization criteria such as MMSE (Minimum Mean Squared Error) or zero-forcing, which in general involves matrix inversion of the channel transfer matrix H or functions thereof such as an equalization matrix. This can be computationally expensive, especially when the coherence time of the channel is short and the equalizers have to be updated frequently. For example, the MMSE or zero-forcing equalization process in a MIMO OFDM system is performed over each sub-carrier by inverting a square matrix. The computational complexity of the problem can be appreciated by recognizing that the size of the matrix to be inverted is equal to the number of transmit antennas and the number of sub-carriers, which can vary from 64 for IEEE 802.11n systems (i.e., Wi-Fi systems) to 2048 for IEEE 802.16e systems (i.e., Wi-Max systems). On the other hand, instead of using non-adaptive linear equalizers, adaptive algorithms solve the similar LMMSE or zero-forcing optimization problems by means of stochastic gradient algorithms and avoid direct matrix inversion. Although computationally more manageable, the adaptive algorithms are less robust since their convergence behavior and performance depend on the choices of parameters such as step size.

Accordingly, it would be desirable to provide a method and apparatus for reducing the complexity of the non-adaptive linear equalization process.

BRIEF DESCRIPTION OF THE DRAWINGS

FIG. 1 shows a receiving and transmitting antenna arrangement employing multiple receive antenna and multiple transmit antennas.

FIG. 2 illustrates a functional block diagram of one example of a wireless receiver system 10 that can perform channel equalization using the techniques described herein.

DETAILED DESCRIPTION

Figure 3:
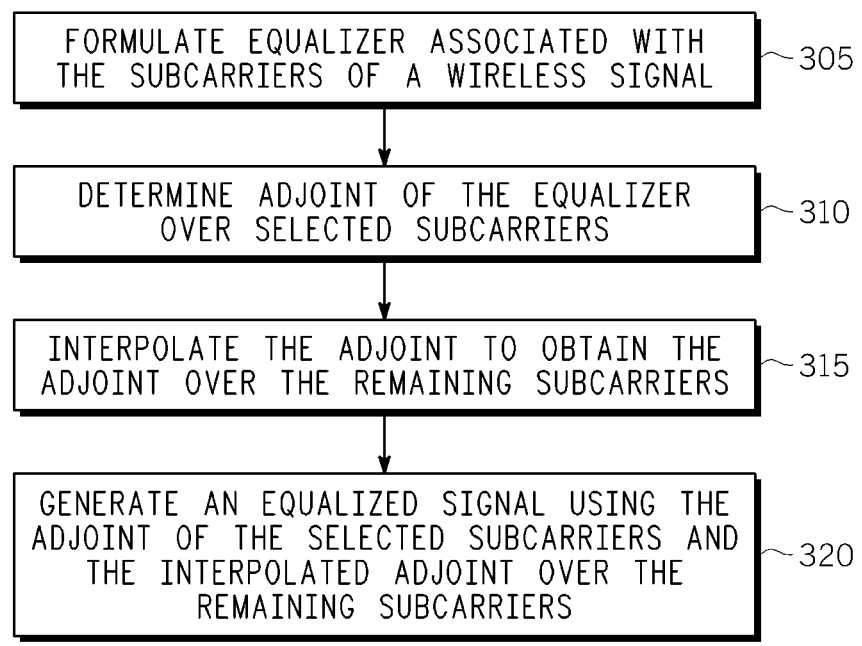
FIG. 3 shows one example of a method for performing channel equalization on a wireless signal.

As detailed below, matrix inversion, used in linear equalization, is replaced by the adjoint of the matrix without any loss of generality. Use of the adjoint eliminates the need to perform divisions, which leads to a more stable algorithm from the fixed-point implementation point of view. Then, instead of computing the adjoint of the matrix over each sub-carrier the adjoint of the matrix is computed only over a few of the sub-carriers, after which the results are directly interpolated to obtain the equalization matrix over the rest of the sub-carriers. The computational cost of this approach is equal to the cost of the adjoint computation over a few sub-carriers and the cost of interpolation over the rest of the sub-carriers. Since interpolation is less complex than adjoint computation a substantial reduction in complexity is achieved without any significant performance impairments.

FIG. 2 illustrates a functional block diagram of one example of a wireless receiver system 10 that can perform channel equalization using the techniques described herein. In some particular examples the receiver may conform to either the IEEE 802.11 or the 802.16 wireless LAN standards. A data signal or burst is received by an antenna 14, which transfers the data signal to a front end processing component 12. The data signal or burst includes frames that include data as well as other information such as packet information, training information and calibration information. The front end processing component 12 amplifies the data signal, converts the data signal to an intermediate frequency (IF) and filters the data signal to eliminate signals that are outside of the desired frequency band. The front end processing component 12 feeds one or more analog-to-digital (A/D) converters 16 that sample the data signal and provide a digitized signal output. The front end processing component 12 can provide automatic gain control (AGC) to maintain the signal strength relative to the one or more A/D converters 16.

The digitized signal output from the A/D converter 16 is then provided to the digital preprocessor 18, which provides additional filtering of the digitized signals and decimates the samples of the digitized signal. The digital preprocessor 18 then performs a Fast Fourier Transform (FFT) on the digitized signal. The FFT on the digitized signal converts the signal from the time domain to the frequency domain so that the frequencies or tones carrying the data can be provided. The digital processor 18 can also adjust the gain of the LNA at the analog front end 12 based on the processed data, and include logic for detection of packets transmitted to the receiver 10. The exact implementation of the digital preprocessor 18 can vary depending on the particular receiver architecture being employed to provide the frequencies or tones carrying the data. The frequencies and tones can then be demodulated and/or decoded. However, the demodulation of the tones requires information relating to the wireless channel magnitude and phase at each tone. The effects of the dispersion caused by the channel need to be compensated prior to decoding of the signal, so that decoding errors can be minimized. This is achieved by performing channel estimation in the manner described above. Accordingly, the digital preprocessor 18 provides the frequencies or tones to a channel estimator 20.

The channel estimator 20 determines a channel estimate employing training tones embedded in training symbols located in the signal preamble. Since the training tones have a known magnitude and phase, the channel response at the training tones is readily determined. For example, the known channel response at the training tones can then be interpolated in the frequency domain to determine the channel response at the data tones. A cyclic interpolation procedure, for example, can be employed.

The channel estimate is provided to a channel equalizer 21 that performs channel equalization on each of the sub-carriers in the signal using one or more of the techniques that are described below. The equalized signal is then provided to a data demodulator 22 for demodulation of the digital data signal, which then transfers the demodulated data signal to data postprocessing component 26 for further signal processing. The data postprocessing component 26 decodes the demodulated data signal and performs forward error correction (FEC) utilizing the information provided by the data demodulator 22 in addition to providing block or packet formatting. The data postprocessing component 26 then outputs the data.

It will now be shown that the computation of the matrix inverse—used by channel equalizer 21 to perform equalization—can be reduced to the computation of adjoint of the matrix. As the adjoint of a polynomial matrix is polynomial, this fact permits the equalization matrix to be estimated over a few of the sub-carriers, after which the results can be directly interpolated to obtain the equalization matrix over all sub-carriers.

At the outset it should be noted that in the following small letters are used to denote scalar, complex or real variables. Real, complex or integer vectors are denoted by small boldface letters and capital boldface letters are used for real or complex matrices. |.| is the euclidean (frobenious) norm, I denotes the identity matrix and $A^H$ stands for the conjugate transpose of matrix A. det(A) and adj(A) are used to denote the determinant and adjoint of A, respectively.

In MIMO-OFDM systems it is known that the wireless frequency-selective MIMO channel can be divided into several parallel MIMO quasi-static flat fading channels for each sub-carrier. Therefore, we can establish a simple system model per sub-carrier. Let $N_T$ be the number of transmit antennas and $N_R$ the number of receive antennas. The received signal over sub-carrier k can be written as:

$$y_k = H_k x_k + b_k \quad k=1,2,3,\ldots,N \quad (1)$$

N is the number of OFDM sub-carriers. $x_k = [x_{k,1}, \ldots, x_{k,N_T}]^T$ is $N_T \times 1$ transmitted vector, $y_k = [y_{k,1}, \ldots, y_{k,N_R}]^T$ is $N_R \times 1$ vector of received data (both in frequency domain). The entities of $N_R \times 1$ vector $b_k$ are independent identically (i.i.d.) circularly symmetric complex gaussian variables with $E[b_k b_i] = \sigma_k^2 I_{M_R}$. $H_k$ denotes the $N_R \times N_T$ channel transfer matrix over sub-carrier k. Assuming that the channel matrix is of length L taps, the channel transfer function over sub-carrier k is equivalent to:

$$H_k = H(e^{j2\pi k/N}) = \sum_{l=0}^{L-1} H_l e^{-j2\pi kl/N} \quad (2)$$

with $[H_l]_{n,m} = h_{n,m}(l)$ and $h_m^n(l)$ corresponds to the complex gain of the equivalent channel between transmit antenna n and receive antenna m for path index l. It is important to notice that $H_k$ is a polynomial matrix of degree L−1 on $s^{-1;k}$ with $s_k = e^{j2\pi k/N}$ and k=1, 2, ..., N. This fact will be used below to obtain computationally effective inversion methods.

Adjoint Computation

Two types of linear equalizers are used in MIMO-OFDM: ZF and MMSE. ZF equalizer simply inverts the channel by cancelling ISI regardless of the noise, whereas MMSE equalizer minimizes the error due to both noise and interference. The expression of both equalizers over sub-carrier k is given by:

$$G_k^{MMSE} = (H_k^H H_k + \sigma_k^2 I)^{-1} H_k^H \quad G_k^{ZF} = (H_k^H H_k)^{-1} H_k^H \quad (3)$$

It is important to notice that the expression of equalizers given above, is a dimension-reduced formulation which yields to inversion of a $N_T \times N_T$ matrix instead of $N_R \times N_R$ matrix. As $N_T < N_R$ this formalism reduces the computational complexity of matrix inverse.

In fact, two important implementation issues can be addressed here for the matrix inversion:

1. Computational complexity: Indeed in order to compute the equalizer a $N_T \times N_T$ matrix must be inverted over each sub-carrier. Considering the fact that the number of sub-carriers varies from 52 in 802.11n to 2048 in OFDMA and the complexity of each matrix inversion is at least $O(N^{3;7})$ multiplications and most of the inversion algorithms use several additional divisions, it becomes clear that optimizing the DSP code or using multiple parallel DSPs becomes important.

2. Fixed-point algorithm stability: The range of data is an important issue in the conjunction with algorithms to compute the pseudo-inverse since multiplications and divisions double the binary range of data which can decrease the fixed-point algorithm stability.

Important problems in range extension especially occur when we use division and are faced with matrices with large condition numbers. This problem is important in equalization as the condition number of the matrix to be inverted is increased by a power of two when $H_k^H H_k$ is inverted instead of $H_k$. Therefore, a method that removes divisions is of interest.

In the following, we demonstrate that—in the case of linear equalizer (ZF or MMSE)—the computation of matrix inverse can be reduced to the computation of the adjoint of matrix. First consider the expression of the MMSE equalizer, which can be written as:

$$G_k = (H_k^H H_k + \sigma_k^2 I)^{-1} H_k^H \quad (4)$$
$$= \frac{adj(H_k^H H_k + \sigma_k^2 I)}{\det(H_k^H H_k + \sigma_k^2 I)} H_k^H$$

with $\alpha^{-1} = \det(H_k^H H_k + \sigma_k^2 I)$ which is a constant scalar. Therefore $G_k$ can be written as $G_k = \alpha \hat{G}_k$ with $\hat{G}_k = adj(H_k H_k^H + \sigma_k^2 I) H_k^H$. Additionally, the equalization process over the received signal can be written as $\hat{y}_k = G_k y_k = G_k H_k x_k + G_k b_k$. After equalization, the equalized and coded symbols $\hat{y}_k$ pass through the Maximum Likelihood detector. The maximum likelihood detection is based on the maximization of likelihood criterion which is defined as the conditional pdf $p(\hat{y}_k | x_k, H_k)$. We can write:

$$\tilde{y}_k = \text{argmax}_{x_k} \log \prod_{k=1}^{N} p(\hat{y}_k | x_k, H_k) \quad (5)$$

For the sake of simplicity, in equation (5), we omit the OFDM symbol index and we keep the sub-carrier index k without loss of generality. In fact in a general case the maximum likelihood sequence detector is obtained considering also the symbol index (see J. G. Proakis "*Digital Communications*", McGraw Hill International editions Electrical Engineering series). In a rigorous mathematical notation we also have to consider the criterion for the interleaved bits instead of symbols. However, as there is a unique correspondence between received symbols and interleaved bits we can consider the above mentioned equation. The joint conditional pdf can be written as:

$$p(\hat{y}_k | x_k, H_k) = \frac{1}{\sqrt{2\pi}\sigma_k} \exp\left(-\frac{\|\hat{y}_k - G_k H_k x_k\|^2}{2\|G_k\|^2 \sigma_k^2}\right) \quad (6)$$

If we replace the equation (6) into (5) and we consider the fact that $G_k = \alpha \hat{G}_k$, we obtain:

$$\tilde{y}_k = \text{argmin}_{x_k} \sum_{k=1}^{N} \frac{\|G_k y_k - G_k H_k x_k\|^2}{2\|G_k\|^2 \sigma_k^2} = \quad (7)$$

$$\text{argmin}_{x_k} \sum_{k=1}^{N} \frac{\|\hat{G}_k y_k - \hat{G}_k H_k x_k\|^2}{2\|\hat{G}-k\|^2 \sigma_k^2}$$

Therefore, we can compute the adjoint of the matrix instead of inverse. As previously noted, the direct advantage of using the adjoint instead of inverse is that there is no division in adjoint computation. Therefore, range extension is less important compared to an algorithm that uses division. As a result there are fewer fixed-point stability problems. However, if this approach is used independently it does not considerably reduce the complexity of inversion. Because of the computational complexity of the adjoint, computation for small matrices is still about $O(N^{3;T})$ multiplications over each sub-carrier. However, for the case of two transmit antennas we can achieve a considerable reduction in complexity using only the adjoint expression.

In fact, in the case of two transmit antennas and several receive antennas, a 2×2 matrix needs to be inverted to perform equalization. In this case, computation of the adjoint of equalization matrix is reduced to a permutation of elements of this matrix and two multiplications with −1. In particular, we will have:

$$adj\left(\begin{bmatrix} a & b \\ c & d \end{bmatrix}\right) = \begin{bmatrix} d & -b \\ -c & a \end{bmatrix} \quad (8)$$

As a result, the computational complexity in this case is about O(2N) multiplications comparing to $O(2^3 N)$ multiplications when we use the inverse of matrix. The reduction in complexity that is achieved is about 75%. Moreover, there is no range extension, which guarantees a fixed-point stability.

In the following it will be shown how this observation concerning the adjoint can be combined with other techniques like interpolation to achieve significant reductions in complexity for more than two transmit antennas, while maintaining the advantage of fixed-point stability.

Interpolation

An important aspect in reducing the computational complexity of matrix inversion is based on interpolation. The previous section has demonstrated that the matrix inverse computation can be reduced to the computation of matrix adjoint. Here, in this section, we show that the adjoint of the matrix can be computed over a few sub-carriers—for each matrix element—and then interpolate the result to obtain the adjoint—for each matrix element—over all sub-carriers. We also present different scenarios that can be used for interpolation.

The concept of interpolation is to select a function p(x) from a given class of functions in such a way that the graph of y=p(x) passes through the given data points $(x_i, y_i)$, i=1, 2, . . . , p. These points may be obtained from a known function like adjoint function. The interpolating function is usually chosen from a restricted class of functions, with polynomials being the most commonly used class. We use the Weierstrass Approximation Theorem as a general framework to prove that we can interpolate the adjoint matrix:

Weierstrass Approximation Theorem: If $f(x)$ is a continuous function on [a,b] and $\epsilon > 0$ is given, then there exist a polynomial p(x), defined on [a,b], with property that

|f(x)−p(x)|<ϵ for all x∈[a,b]

Proposition 1: In equation (2) we have demonstrated that the channel matrix $H_k$ is a polynomial matrix on $s^{-1;k}$. Based on this observation it is clear that $adj(H_k H_k^H + \sigma_k^2 I)$ is also polynomial matrix and therefore continuous over each sub-carrier k with k=1, 2, . . . , N. As a result, according to the Weierstrass approximation theorem, we can find a scalar interpolating polynomial which goes through selected sub-carriers for each element of aforementioned polynomial matrix.

Several interpolation techniques can be used like as polynomial, spline and linear interpolation:

Polynomial Interpolation: Polynomial interpolation is based on the fact that there is a unique polynomial of degree p−1 that goes through p given data points. One of the best known polynomial interpolant is Lagrange polynomial. Polynomial interpolation has the advantage of generating small interpolation error and being infinitely differentiable. However, we don't use it in our approach because it is computationally expensive. We will see later that when we consider the trade-off between computational complexity and overall system performance, we have a small margin. Consequently, we avoid to use complex techniques.

Linear Interpolation: Linear interpolation is a special case of polynomial interpolation. It takes two data points $(x_a, y_a)$ and $(x_b, y_b)$ and gives the interpolant in point (x,y) with $x_a \leq x \leq x_b$ and $y_a \leq y \leq y_b$ that can be computed as:

$$y = y_a + \frac{(x - x_a)(y_b - y_a)}{(x_b - x_a)}$$

We can see that the computational complexity of linear interpolation is very low. Considering the fact that the ratio $$\frac{(x - x_a)}{(x_b - x_a)}$$

is constant and can be computed before the interpolation goes on, we see that the cost of linear interpolation for a one new point is about one multiplication and one addition.

Spline Interpolation: Spline curves are constructed by using a different cubic polynomial curves between each two data points. In the other hand, it is a piecewise cubic curve, made of pieces of different cubic curves considered together. Mathematically, finding the solution of a cubic spline interpolation leads to a triangular matrix resolution. The complexity of triangular matrix resolution over each interpolated point is about 2 divisions, 4 multiplications and 2 subtractions.

In terms of complexity, spline interpolation is situated between linear and polynomial interpolation. However, in practice it may be preferable to use linear interpolation since it does not use division and is less complex for the same number of base points. If more precision is needed the number of base points can be increased while keeping the linear interpolation approach.

In summary, it has been demonstrated that interpolation can be used to compute a part of the matrix inverses after which the results can be interpolated. One formulation of this process can be succinctly stated as follows:

a) Compute $adj(H_k H_k^H + \sigma_k^2 I)$ over p tones with $p \subset \{1, 2, \ldots, N\}$.
b) Interpolate p obtained results to obtain $adj(H_k H_k^H + \sigma_k^2 I)$ for k={1, 2, ..., N}.

The value of p should be chosen by considering the trade-off between computational complexity and performance loss. Simulation results, presented below, will provide guidelines in choosing the value of p.

Complexity Analysis

To compare different algorithms we have to characterize the complexity or the computationally required effort. In general the measure of complexity is given in terms of flops (floating point operations), where the definition varies from one author to another. We will compare the algorithms by the amount of required multiplications. As the additions generally are occurred in pair with multiplications, we only have to count the latter. Moreover, in our computations we consider one complex multiplication—or addition—equivalent to one flop. This does not affect the overall computational complexity analysis as we are comparing several algorithms in the same way. However, complex operations must be decoupled at the final evaluation. We don't take to account the fact that the matrices to be inverted are symmetric so that the exact number of multiplications and the memory required for element storage can be reduced. The number of divisions are counted separately because their implementation needs more DSP cycles than additions or multiplications.

In the following we will give the exact cost of each approach as a function of N, p and $N_T$. We recall that N is the total number of sub-carriers of MIMO-OFDM system. p denotes the number of points chosen to compute matrix adjoint. Consequently, N−p is the number of points which are interpolated and $N_T$ denotes the number of transmit antennas.

Complexity of per-tone inversion: One of the most common and most effective inversion algorithms used to compute the inverse of symmetric positive definite matrix is cholesky inversion. The computational cost in term of complex multiplications is about:

$$O(N N_T^3)$$

To this computational cost we have to add the computational cost of real divisions performed in cholseky decomposition which is equal to:

$$O\left(N \times \left(\frac{N_T(N_T - 1)}{2} + N_T\right)\right)$$

We have also to compute $N \times N_T$ real square root operations. Square root values can be stored directly in a look up table containing values of $$\frac{1}{\sqrt{x}}$$

and computed by multiplying the desired value with x.

Complexity of linear interpolation: Here we have only multiplications to perform. the computational cost would be:

$$\underbrace{O(p C_{adj})}_{adjoint} + \underbrace{O((N - p)N_T^2)}_{linear\ interpolation}$$

where $C_{adj}$ denotes the computational cost of adjoint (number of multiplications) as a function of matrix size. For $N_T$=3, $C_{adj}$=12 and for $N_T$=4, $C_{adj}$=72. On the other hand we can achieve complexity reduction up to 4 transmit antennas. In fact for higher dimensions the complexity of adjoint computation becomes prohibitive. So we can not obtain complexity reduction over 5 or 6 transmit antennas.

Simulation Results

Several simulations were performed to address the trade-off between the number of chosen base points and the performance of the proposed interpolation scheme. Simulations were performed in the context of the 802.11n standard in a 20 MHz band-width with 64 point FFT and 52 data sub-carriers. We study the case of SDM with several transmit antennas where $2 < N_T < 5$ and $N_R > N_T$.

For every transmit-receive antenna pair an independent identically (i.i.d.) distributed channel realization is drawn. Every channel realization is a discrete-time sequence consisting of a number of independently distributed taps. The channel responses follow an exponential power/delay profile defined by the RMS delay spread, which is the maximum time difference between the arrival of the first and the last multipath signal seen by the receiver. We investigate two RMS delay spread values: 15 ns and 50 ns which corresponds respectively to channel model TGn B (house environment) and TGn D (office environment).

Tables (2), (3) and (4) summarize the performance results obtained for the SDM case. In table (2) the SDM case with 3 transmit antennas and 4 receive antennas is considered that yields to a 3×3 matrix inversion. Tables (3) and (4) demonstrate the SDM case with 4 transmit antennas and 5 and 6 receive antennas. This scheme yields to a 4×4 matrix inversion.

TABLE 1

Achieved complexity reduction versus number of chosen base points

|  | 18-linear | 27-linear | 38-linear |
|---|---|---|---|
| SDM $N_T = 3$ | %66 | %65 | %62.7 |
| SDM $N_T = 4$ | %47 | %33 | %17 |

Performance results are reported as the performance loss (in dB) observed at a packet error rate of $5e^{-2}$ when we compare interpolated scheme versus the exact scheme.

When we compare the performance results of tables (2), (3) and (4) we realize that better performance results are obtained in the case of TGn B channels compared to the TGn D channels with the same number of chosen base points. This is because the channel response of TGn B is shorter than TGn D, which gives a more accurate estimation of equalizer coefficients with a given number of base points.

The aforementioned tables also summarize the performance of interpolation based schemes as a function of modulation type and different data rates varying from QPSK rate ½ up to 64QAM rate ⅚. According to these tables, for low constellations like a QPSK with rate ½ and a QAM16 with rate ½ we can choose 18 base points without loss of performance. This means that the adjoint of matrix is computed over 18 base points and the rest is interpolated. For higher order constellations like a QAM64 rate ¾ and a QAM64 rate ⅚ we have to increase the number of base points to 27 and 38 to maintain a low level of performance loss for both TGn B and TGn D.

TABLE 2

Performance comparison for SDM 3 × 4 at per = $5e^{-2}$ between exact and interpolated adjoint computation

|  | TGn B | | | TGn D | | |
|---|---|---|---|---|---|---|
|  | 18-linear | 27-linear | 38-linear | 18-linear | 27-linear | 38-linear |
| QPSK ½ | 0 | 0 | — | 0.25 | 0 | — |
| QAM16 ½ | — | 0 | — | — | 0.2 | — |
| QAM16 ¾ | — | 0.5 | — | — | 1 | — |

TABLE 2-continued

Performance comparison for SDM 3 × 4 at per = $5e^{-2}$ between exact and interpolated adjoint computation

|  | TGn B | | | TGn D | | |
|---|---|---|---|---|---|---|
|  | 18-linear | 27-linear | 38-linear | 18-linear | 27-linear | 38-linear |
| QAM64 ¾ | — | 1 | 0.5 | — | 4 | 2 |
| QAM64 ⅚ | — | 3 | 1 | — | fail | 4 |

TABLE 3

Performance comparison for SDM 4 × 5 at per = $5e^{-2}$ between exact and interpolated adjoint computation

|  | TGn B | | | TGn D | | |
|---|---|---|---|---|---|---|
|  | 18-linear | 27-linear | 38-linear | 18-linear | 27-linear | 38-linear |
| QPSK ½ | 0 | 0 | — | 0.25 | 0 | — |
| QAM16 ½ | — | 0.25 | — | — | 0.5 | — |
| QAM16 ¾ | — | 1 | — | — | 2 | — |
| QAM64 ¾ | — | 5 | 2.5 | — | fail | 5 |
| QAM64 ⅚ | — | fail | 5 | — | fail | fail |

TABLE 4

Performance comparison for SDM 4 × 6 at per = $5e^{-2}$ between exact and interpolated adjoint computation

|  | TGn B | | | TGn D | | |
|---|---|---|---|---|---|---|
|  | 18-linear | 27-linear | 38-linear | 18-linear | 27-linear | 38-linear |
| QPSK ½ | 0 | 0 | — | 0 | 0 | — |
| QAM16 ½ | — | 0 | — | — | 0.25 | — |
| QAM16 ¾ | — | 0.5 | — | — | 0.5 | — |
| QAM64 ¾ | — | 2 | 1 | — | 4 | 1.5 |
| QAM64 ⅚ | — | 3 | 1.5 | — | fail | 3 |

Clearly, less complexity reduction is achieved when we have more base points. Table (1) summarizes the achieved complexity reductions for our examples. Even in the worst case we can achieve a complexity reduction of 17%. In practise, the complexity reduction will be more than 17% if we also consider the cost of divisions needed for the computation of the Cholesky decomposition.

When we compare tables (3) and (4) we realize that when we have more receive antennas we obtain less performance loss with the same number of base points.

Therefore, we can propose two solutions, both using the interpolation approach. The first solution uses a fixed interpolation step that reduces the complexity of the receiver without a considerable loss in performance. For example, in the case of 38 base points for 802.11n the reduction in complexity of the receiver is more than 17%. Another solution, perhaps more attractive in some cases, uses an adaptive interpolation step. For lower order modulation cases (e.g., QPSK, QAM16) we use a large interpolation step and for higher order modulation cases (e.g., QAM64) we reduce the interpolation step. In this case, we can achieve a fixed complexity reduction (i.e., the percentage of the complexity reduction is fixed for higher order constellations). Consequently, for the case of lower order constellations we reduce the power consumption of circuit. This can extend the battery life and reduce system temperature and noise.

FIG. 3 shows one example of a method for performing channel equalization on a wireless signal. The method begins in step 305 by formulating an equalizer associated with the sub-carriers of the wireless signal. The equalizer is a function of a quantity relating to signal quality such as the channel transfer function. Next, in step 310, an adjoint of the equalizer is determined over a selected number of the subcarriers. The adjoint determined in step 310 is interpolated in step 315 to obtain an adjoint of the equalizer over the remaining ones of the subcarriers of the wireless signal. An equalized signal is generated in step 320 for each of the subcarriers using the adjoint of the equalizer over the selected number of subcarriers and the interpolated adjoint over the remaining ones of the subcarriers.

The processes described above, including that shown in FIG. 3, may be implemented in a general, multi-purpose or single purpose processor. Such a processor will execute instructions, either at the assembly, compiled or machine-level, to perform that process. Those instructions can be written by one of ordinary skill in the art following the descriptions herein and stored or transmitted on a computer readable medium. The instructions may also be created using source code or any other known computer-aided design tool. A computer readable medium may be any medium capable of carrying those instructions and includes a CD-ROM, DVD, magnetic or other optical disc, tape, silicon memory (e.g., removable, non-removable, volatile or non-volatile), packetized or non-packetized wireline or wireless transmission signals.

It will furthermore be apparent that other and further forms of the invention, and embodiments other than the specific embodiments described above, may be devised without departing from the spirit and scope of the appended claims and their equivalents, and it is therefore intended that the scope of this invention will only be governed by the following claims and their equivalents.

The invention claimed is:

1. A method of performing channel equalization on a wireless signal, comprising:
   (i) receiving a wireless signal at a wireless receiver system;
   (ii) formulating, at a processor in the wireless receiver system, an equalizer associated with sub-carriers of the wireless signal, wherein the equalizer is a function of a quantity relating to signal quality;
   (iii) determining, at a processor in the wireless receiver system, an adjoint of the equalizer over a selected number of the subcarriers, wherein the adjoint is a transpose of a cofactor matrix of an equalization matrix;
   (iv) interpolating, at a processor in the wireless receiver system, the adjoint determined in (iii) to obtain an adjoint of the equalizer over remaining ones of the subcarriers of the wireless signal; and
   (v) generating, at a processor in the wireless receiver system, an equalized signal for each of the subcarriers using the adjoint of the equalizer over the selected number of subcarriers and the interpolated adjoint over the remaining ones of the subcarriers.

2. The method of claim 1 wherein the quantity related to signal quality is a channel transfer function Hxy.

3. The method of claim 1 wherein the equalizer is a linear equalizer.

4. The method of claim 3 wherein the linear equalizer is a zero-forcing equalizer.

5. The method of claim 3 wherein the linear equalizer is a Minimum Mean Squared Error (MMSE) equalizer.

6. The method of claim 1 wherein the interpolating is performed using polynomial, linear or spline interpolation.

7. The method of claim 1 wherein the wireless signal employs a multicarrier modulation scheme.

8. The method of claim 1 wherein the interpolating is performed using a fixed step size.

9. The method of claim 1 wherein the interpolating is performed using an adaptive step size based on a modulation scheme employed by the wireless signal.

10. The method of claim 9 wherein a larger step size is used for lower order modulation schemes and a smaller step size is used for higher order modulation schemes.

* * * * *